Aug. 18, 1959 — A. C. WEISS — 2,900,465
SPEED CHANGE INDICATOR
Filed Oct. 4, 1955 — 2 Sheets-Sheet 1
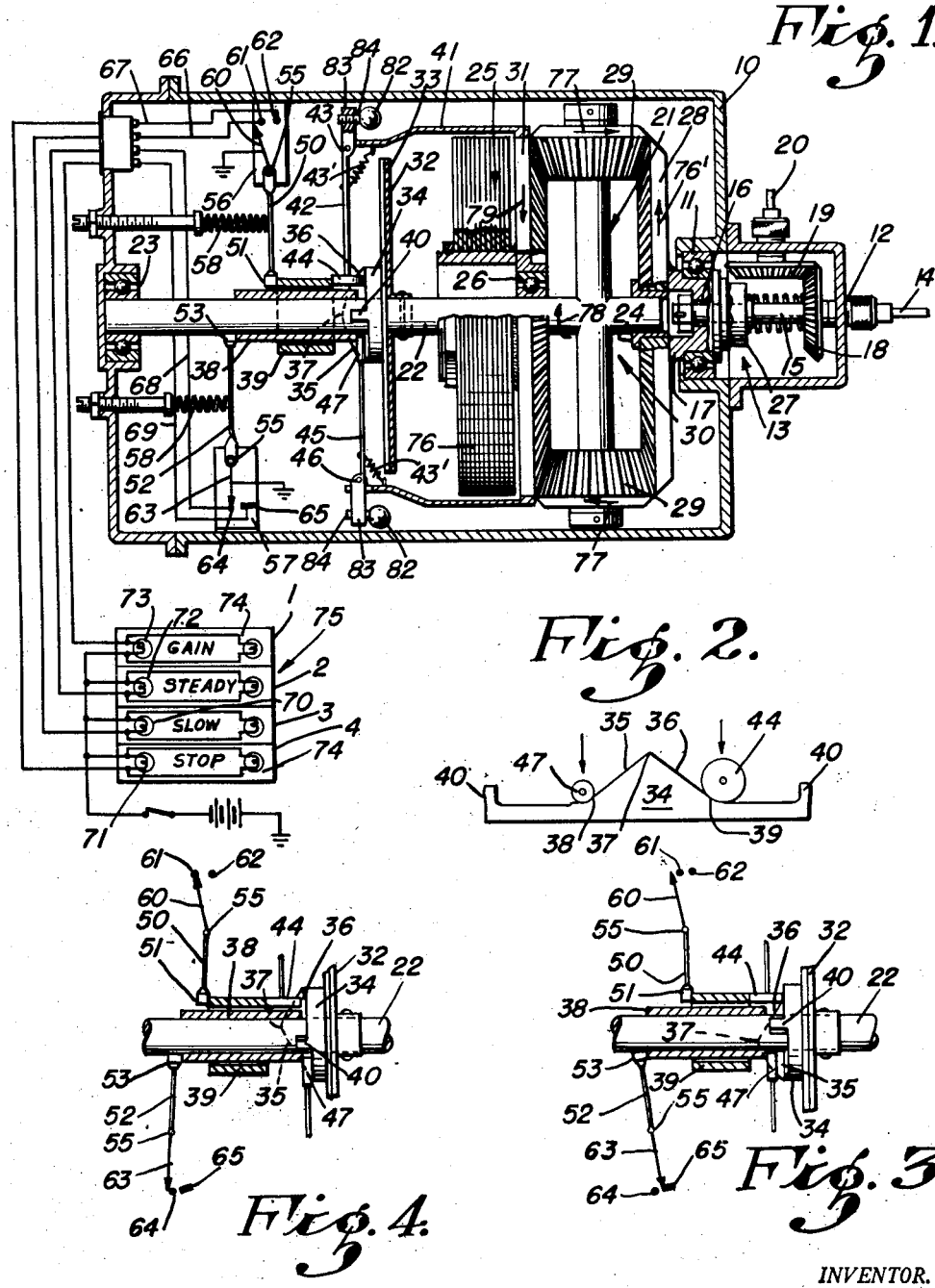
INVENTOR.
AUGUST C. WEISS
BY
Attorney Aug. 18, 1959     A. C. WEISS     2,900,465
SPEED CHANGE INDICATOR
Filed Oct. 4, 1955     2 Sheets-Sheet 2
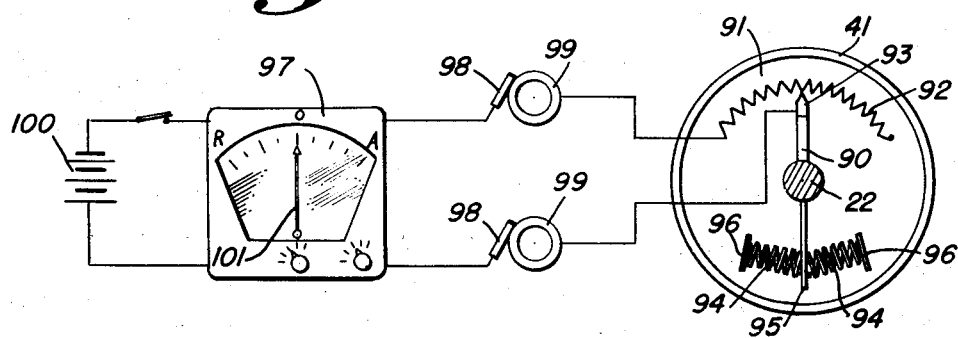
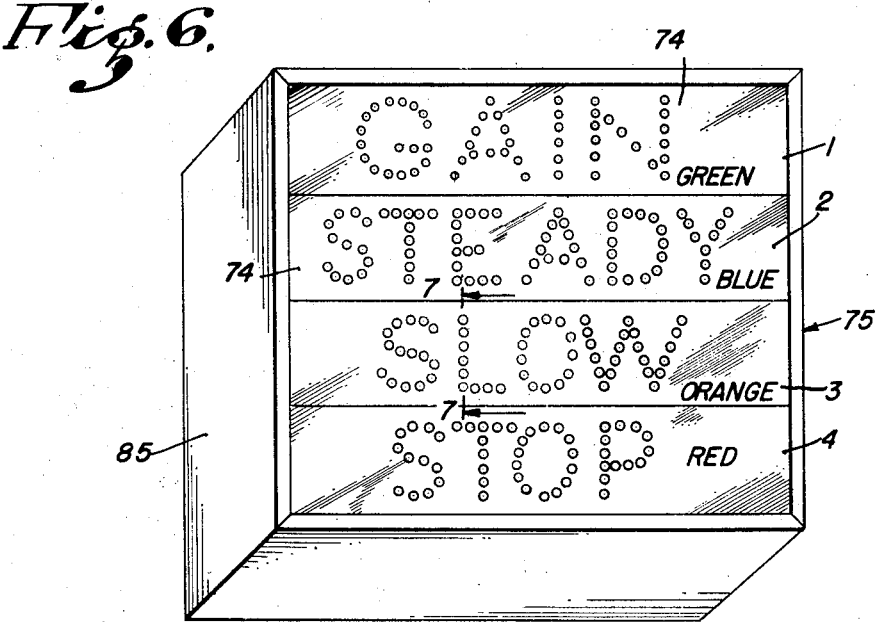
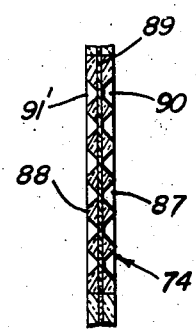
INVENTOR.
AUGUST C. WEISS

United States Patent Office

2,900,465
Patented Aug. 18, 1959

2,900,465

SPEED CHANGE INDICATOR

August C. Weiss, Los Angeles, Calif.

Application October 4, 1955, Serial No. 538,388

7 Claims. (Cl. 200—61.46)

This invention relates to a device for indicating changes in speed of a moving device or part. The invention is of especial utility on automotive vehicles as a means for indicating to other drivers whether the vehicle on which the device is employed is travelling at a steady speed, or is accelerating or decelerating, and also the degree thereof. When a vehicle provided with the invention is travelling at a steady speed, the drivers of the following vehicles are apprised of this by a suitable signal, but when there is a change in speed of the vehicle a signal is displayed which will indicate the same to other drivers.

It is an object of the invention to provide a means which will contribute to greater safety in high speed vehicle travel on highways. At the present time a following driver can only determine whether the car ahead is slowing down or increasing its speed by a close observance of the change in the distance between the leading and following automobiles. When the present invention is employed on the leading car any slight change in its speed of travel will produce an indication observable by other drivers so that they may immediately act accordingly, avoiding the delay occasioned at the present time by the need for observance of changes in the distance between leading and following cars. For example, should the car equipped with the invention, while travelling along at high speed start to diminish its speed, knowledge of this slowing down of the vehicle will be immediately imparted to the following driver or drivers by a display of an appropriate signal.

It is a further object of the invention to provide in the device means whereby small and large changes in speed are indicated by separate signals so that other drivers may know whether the driver of the equipped car is merely retarding the speed of his vehicle at a small rate of change or whether he is making a rapid rate of change, as, for example, when the driver is applying the car brakes in a manner to bring it to a stop.

Although the invention is of a special utility on automotive vehicles, it may be advantageously employed in conjunction with various moving parts. Accordingly, it is an object of the invention to provide a speed change indicator having a driving member adapted to be connected to the object concerning which information as to speed changes desired, and to provide first and second rotary members which are operated by force received from the driving member in such manner they will actuate a speed change indicator when the speed of the reference object changes.

It is an object of the invention to provide a speed change indicator having a pair of relatively rotatable members arranged to be driven through a differential means from a driving connection which is rotated in accordance with the speed of the reference object, said members having one direction of relative rotation during the time the driving connection is being accelerated and having opposite relative rotation when the driving connection is decelerating.

It is an object of the invention to provide a device as described in the preceding paragraph wherein relative rotation of the rotatable parts during acceleration will effect the display of a signal indicating to others that the equipped vehicle is accelerating, and in which device opposite relative rotation of the rotatable members as the result of deceleration will cause display of one signal when the deceleration is slight and the display of a second signal when the rate of deceleration is relatively high.

A further object of the invention is to provide a device of the character set forth in the foregoing having an indicator which operates by gradient instead of by step.

Further objects and advantages of the invention may be brought out in the following part of the specification wherein some details have been described for the purpose of competence of disclosure, without intending to limit the scope of the invention which is defined by the appended claims.

Referring to the accompanying drawings, which are for illustrative purposes only:

Fig. 1 is a partly sectioned schematic view of a preferred form of the invention;

Fig. 2 is a schematic view showing the cam laid out flat;

Fig. 3 is a schematic view showing positions of parts during acceleration;

Fig. 4 is a schematic view similar to Fig. 3, but showing the positions of parts during deceleration;

Fig. 5 is a schematic view showing a means whereby the indicator may operate by gradient;

Fig. 6 is a perspective face view of an indicator forming part of my invention; and Fig. 7 is a fragmentary sectional view taken as indicated by the line 7—7 of Fig. 6.

As shown in Fig. 1 the device includes a housing 10 having at the rightward end thereof bearings 11 and 12 for supporting a driving connection 13 adapted to be connected to a rotary part, such as a shaft or specifically the flexible shaft 14 of an automotive vehicle adapted to drive the customary speedometer.

The driving connection 13 includes a shaft 15 supported at one end by the bearing 12 and at the other end by a bearing 16 in a gear hub 17 which is supported by the bearing 11. A small bevel gear 18 is fixed on the shaft 15 so as to be rotated thereby and the housing 10 supports a similar bevel gear 19 in a position to be driven by the gear 18, this gear 19 being arranged for connection to a flexible shaft 20 which is extended to the speedometer of the automobile for driving the same.

The device has a first rotatable part 21 comprising a shaft 22 supported for rotation at its leftward end by a bearing 23 carried by the housing 10, and at its rightward end by a bearing 24 supported by the gear hub 17. The invention also includes a second rotatable member 25 which is supported for rotation around the axis of the shaft 22 by a bearing 26 which is mounted on an intermediate portion of the shaft 22. Means are provided for transmitting rotation from the driving connection 13 to the shaft 22. This means comprises a limited torque clutch 27 keyed on the shaft 15 and being adapted to drive the hub 17, a bevel gear 28 mounted on the hub 17 and small bevel gears 29 which are supported in engagement with the gear 28 by transverse shafts 30 projecting radially from the shaft 22.

A gear 31, which is a duplicate of the gear 28, is mounted on the rotatable member 25 in a position to engage the gears 29 in opposing relation to the gear 28. When the gear 28 is rotated, the gears 29 will roll around the gear 31 thereby revolving the rotatable member 21. The gears 29 likewise comprise means for transmitting rotation from the rotatable member 21 to the rotatable member 25 as will be made clear in the following explanation.

A disc 32 is fixed on the shaft 22 and in frictional engagement with this disc there is a second disc 33 which is fixed on a cam member 34 which surrounds the shaft 22 and ordinarily rotates therewith due to the frictional engagement of the discs 32 and 33. The cam 34 is of circular form. It has a pair of sloping faces 35 and 36 leading to a peak 37. The outer or lowest ends 38 and 39 of the cam faces 35 and 36 are spaced about 90° from the peak 37, and at approximately 180° from the peak 37 the cam 34 has a projecting stop 40. The second rotatable member 25 has a cylindric wall 41 extending leftwardly from the periphery of the gear 31. An arm 42 is connected to the wall 41 by a hinge 43 and extends radially inwardly so as to support a roller 44 in position for engagement with the cam face 36. Diametrally opposite from the arm 42 an arm 45 is connected by a hinge 46 to the cylindric wall 41, this arm 45 also carrying a roller 47 for engaging the cam face 35. A relatively smaller and longer sleeve 38 surrounds the shaft 22 and its rightward end is arranged to engage the roller 47. A sleeve 39 of relatively larger diameter and lesser length surrounds the sleeve 38. Its rightward end engages the roller 44 which is spaced outwardly from the face of the shaft 22 so as to leave a space for the rightward end of the sleeve 38.

A switch arm 50 supports a roller 51 in engagement with the leftward end of the sleeve 39 and a switch arm 52 supports a roller 53 in engagement with the leftward end of the sleeve 38. The outer ends of the switch arms 50 and 52 are respectively connected by hinges 55 to supports 56 and 57 located within the housing 10. Adjustable compression springs 58 apply rightward forces to the levers 50 and 52, which forces are transmitted through the sleeves 38 and 39 to the rollers 47 and 44 and tension springs 43' are connected between the arms 42 and 45 and the wall 41 to swing the arms rightwardly. Acting under the rightward forces imparted thereto by the springs 43' and 58, the rollers 44 and 47 tend to hold the cam 34 in such position that the cam peak will be centralized between the rollers as shown in Figs. 1 and 2. At this time the switch arms 50 and 52 are disposed in the positions in which they are shown in Fig. 1. The switch arm 50 carries a grounded movable contact 60 in a position slightly to the left of a stationary contact 61 which is spaced leftwardly from a stationary contact 62. The switch lever 52 carries a grounded movable contact 63 which at this time rests in engagement with a stationary contact 64 which is spaced leftwardly from a stationary contact 65.

Through respective conductors 66, 67, 68 and 69 the contacts 61, 62, 64 and 65 are connected to signal means shown as lamps 70, 71, 72 and 73 arranged to illuminate windows 74 of a signal unit 75 adapted to be secured on the back of a vehicle so as to be clearly visible from the rear. A similar display unit may be employed on the front of the vehicle, if desired. The windows 74 are suitably colored and lettered. For example, the Gain window at the top may be Green, the Steady window may be Blue, the Slow window may be Orange and the Stop window may be Red.

The rotatable member 25 having a plurality of metal plates 76 as a part thereof is of greater mass than the rotatable member 21. When the driving connection 13 is stationary, the parts of the device will occupy the relative positions thereof shown in Fig. 1. Also, when the rotatable members 21 and 25 are revolving at the same speed around the axis of the shaft 22, the relative positions of the cam, roller and switch parts of the device will be as shown in Fig. 1. At this time the movable contact 63 will be in engagement with the contact 64 and the steady lamp 72 will be illuminated. If the rotatable parts of the device are stationary, and rotation is imparted through the driving shaft 15 to rotate the gear 28 as indicated by the arrow 76' of Fig. 1, force will be imparted to the gears 29 to rotate the same in the direction of the arrows 77, with the result that the shaft 22 tends to rotate in the direction of the arrow 78 and the gear 31 tends to rotate in the direction of the arrow 79. Accordingly, relative movement of the rotatable members 21 and 25 is effected. This relative movement consists in a tendency for the rotatable member 21 to rotate in clockwise direction and for the member 31 to rotate in counterclockwise direction. Since the rollers 44 and 47 are a part of the second rotatable member 25 they will tend to rotate in counterclockwise direction, and relatively thereto and the cam 34 will be rotated in clockwise direction toward or through a position thereof schematically shown in Fig. 3. In other words, the peak 37 will be shifted in a direction corresponding to movement of the sloping cam face 35 under the roller 47 so that the roller 47 will be displaced leftwardly from the position in which it is shown in Fig. 1, thereby moving the sleeve 38 and the roller 53 leftwardly and causing the switch arm 52 to swing the contact 63 over into engagement with the stationary contact 65 so that the gain lamp 73 will be illuminated, thereby indicating that acceleration of the vehicle is occurring.

After a desired forward movement of the vehicle is established, the rollers 44 and 47 will centralize the cam 34 and the rotatable parts 21 and 25 will revolve at the same speed. Should there then be a further increase in the velocity of the driving shaft 15, the same relative rotation of the members 21 and 25 will occur and the gain lamp 73 will be again illuminated.

The speed of rotation of the shaft 15 is representative of or proportionate to the speed of travel of the vehicle. Should the vehicle operator retard its speed, there will be a reduction in the speed of the shaft 15, resulting in a reduction in the forward speed of rotation of the gear 28. Inertia acting in the mass 76 of the rotatable member 25 will tend to maintain the speed of rotation of the rotatable member 25 so that there is relative rotation between the members 21 and 25 opposite to that indicated by the arrows 78 and 79, as the result of the differential effect of the gears 28 and 29 and 31. This will cause the cam to rotate relative to the rollers 44 and 47 toward or through the position thereof shown in Fig. 4. The cam peak 37 will be displaced from its centralized position in a direction corresponding to the movement of the cam face 36 under the roller 44 so that the roller 44 will be displaced leftwardly, likewise shifting the sleeve 39 and the roller 51 leftwardly so as to swing the movable contact 60 in clockwise direction into engagement with the contact 61, illuminating the slow lamp 70. Should the operator, while the vehicle is travelling forwardly, apply the brakes forcibly so as to effect a deceleration of the vehicle at increased rate of deceleration, the forces acting through the differential gears will cause the cam 34 to rotate a greater angular distance relative to the rollers 44 and 47, so that the roller 44 will be displaced leftwardly to a greater extent, thereby carrying the movable contact 61 into engagement with the contact 62 so that the stop lamp 71 will be illuminated, thereby indicating to others that a rapid deceleration of the vehicle is taking place.

In Fig. 1, I also show counterweights 82 associated with outer ends of the arms 42 and 45 for increasing the pressure of the rollers 44 and 47 against the cam 34 and thereby increasing the centralizing effect of the rollers on the cam as the speed of rotation increases. The arms 42 and 45 have portions 83 which project beyond the hinges 43 and 46. The counterweights 82 lie in offset relation to the hinges, as shown, and have stems 84 which are threaded into the projecting portion 83 of the arms 42 and 45, making it possible, by rotation of the counterweights 82 to screw them in or out of the projecting portions 83, thereby changing the eccentricity of the counterweight 82 and adjust the effects thereof.

In Fig. 6, I show the box of the signal unit 75, adapted to be installed upon the exterior of the vehicle. This box, as indicated at 85, is relatively shallow and is divided into sections 1, 2, 3 and 4, the fronts of which are covered by transparent plates 74 of suitable color and constructed as shown in Fig. 7. Each transparent plate consists of inner and outer transparent plates 87 and 88 arranged on opposite sides of a translucent colored sheet 89. Aligned conical openings 90' and 91' are formed in the sheets 87 and 88, and these openings are arranged so as to form letters. For example, the cover plate 74 of the upper section 1, Fig. 6, will have the openings arranged so as to form the letters G, A, I and N through which light from the interior of the top section 1 may brightly shine when the top section is illuminated. The cover plates 74 of the sections 2, 3 and 4 are respectively provided with openings 90' and 91' arranged to spell out the words Steady, Slow, and Stop.

As schematically shown in Fig. 1, I propose to employ a plurality of each lamp 70, 71, 72 and 73, in the respective sections 3, 4, 2 and 1 of the unit 75, connected in parallel, so that if one lamp should burn out illumination of a section would not be lost.

In Fig. 5, I have schematically indicated the shaft 22 of the device shown in Fig. 1, with a switch contact arm 90 extending outwardly therefrom. Also, in Fig. 5, the wall 41 of the device is shown. This wall 41 supports a plate 91 of insulating material in a position surrounding the shaft 22. On this plate 91 a resistance element 92 is mounted. The contact arm 90 has thereon a contact which engages the resistance 92 and which slides therealong when relative movement of the shaft 22 and the cylindrical wall 41 occurs. The contact 93 is normally maintained in centralized relation to the resistance 92 by springs 94 arranged between an arm 95 which projects from the shaft 22 and lugs 96 which project from the plate 91. Electrical indicating means, shown as a meter 97, is connected through brushes 98 and commutator rings 99, which are mounted on the shaft 22, with the resistance 92 and the contact 93. A battery 100 is shown as a source of electrical potential. The meter 97 may be of any known type and may include a Wheatstone bridge having its characteristic adjustment whereby the needle 101 of the meter 97 may be adjusted to a centralized or zero position when the contact 93 is in the center of the resistance 92.

When relative movement of the contact 93 and the resistance 92 occurs as the result of acceleration or deceleration of a shaft 22, as explained with relation to Fig. 1, the needle 101 will move to the right of the zero point to indicate acceleration or it will move to the left to indicate retard of speed. The needle 101 indicates the degree of the rate of velocity change for the reason that higher rates of change will cause greater relative movement between the shaft 22 and the member 41, with corresponding movements of the contact 93 on the resistance 92 which will be indicated by the extent to which the needle 101 moves out of its zero position.

I claim:

1. In a speed change indicator of the character described: a driving connection adapted to be rotated at a speed which varies in accordance with the speed of an object; first and second rotatable members supported for rotation; means for imparting rotation from said driving connection to said first member; gear driving means for imparting rotation from said first member to said second member so that said members may rotate at different speeds and so that said members may obtain the same speed of rotation said members being free from any other driving connection therebetween; and indicating means having first and second rotatable parts respectively connected to said first and second rotatable members; and means for maintaining said parts in one relative position when said members are rotating at the same speed and for moving said parts out of said relative position when said members tend to rotate at different speeds due to the change in speed of one of said members as the result of change in speed of said driving connection.

2. A device as defined in claim 1 wherein said parts are moved out of said relative position to smaller and larger extent depending on the rate of change in the speed of said driving connection.

3. In a speed change indicator of the character described: a driving connection adapted to rotate at a speed which varies in accordance with the speed of an object; first and second rotatable members supported for rotation; differential means for rotating said members from said driving connection, whereby said members may rotate at different speeds and may obtain the same speed of rotation, said differential means being the sole driving connection between said members; and indicating means having first and second rotatable parts respectively connected to said first and second rotatable members; and means for maintaining said parts in one relative position when said members are rotating at the same speed and for moving said parts out of said relative position when said members tend to rotate at different speeds due to the change in speed of one of said members as the result of change in speed of said driving connection.

4. A device as defined in claim 3 wherein said parts are moved out of said relative position to smaller and larger extent depending on the rate of change in the speed of said driving connection.

5. In a speed change indicator of the character described: a driving connection adapted to rotate at a speed which varies in accordance with the speed of an object; first and second rotatable members supported for rotation; differential means for rotating said members from said driving connection, whereby said members may rotate at different speeds and may obtain the same speed of rotation; indicating means having first and second rotatable parts respectively connected to said first and second rotatable members; means for maintaining said parts in one relative position when said members are rotating at the same speed and for moving said parts out of said relative position when said members tend to rotate at different speeds due to the change in speed of one of said members as the result of change in speed of said driving connection, said parts moving out of said relative position to smaller and larger extent depending upon the rate of change in the speed of said driving connection; and said indicating means comprising a cam arranged to be moved by the rotation of one of said members and a cam follower arranged to be moved on said cam by the relative rotation of the other of said members.

6. In a speed change indicator of the character described: a driving connection adapted to rotate at a speed which varies in accordance with the speed of an object; first and second rotatable members supported for rotation; differential means for rotating said members from said driving connection, whereby said members may rotate at different speeds and may obtain the same speed of rotation; indicating means having first and second rotatable parts respectively connected to said first and second rotatable members; means for maintaining said parts in one relative position when said members are rotating at the same speed and for moving said parts out of said relative position when said members tend to rotate at different speeds due to the change in speed of one of said members as the result of change in speed of said driving connection, said parts being moved out of said relative position to smaller and larger extent depending upon the rate of change in speed of said driving connection, said indicating means comprising a cam having a sloping cam face connected to one of said members so as to be rotated thereby, a cam follower connected to the other of said members so as to be rotated thereby, and means for urging said follower into engagement with said sloping cam face so that when said members are rotating at the same speed said follower may assume a position at the lower end of said cam face and will resist relative rotation of said cam follower.

7. In a speed change indicator of the character described: a driving connection adapted to be rotated at a speed which varies in accordance with the speed of an object; first and second rotatable members supported for rotation; means for imparting rotation from said driving connection to said first member; means for imparting rotation from said first member to said second member so that said members may rotate at different speeds and so that said members may obtain the same speed of rotation; indicating means having first and second rotatable parts respectively connected to said first and second rotatable members; means for maintaining said parts in one relative position when said members are rotating at the same speed and for moving said parts out of said relative position when said members tend to rotate at different speeds due to the change in speed of one of said members as the result of change in speed of said driving connection; and said indicating means comprising a pair of cams adapted to be rotated by one of said members, said cams being sloped in opposite directions and cam follower means connected to the other of said members and being arranged to engage said cam.

References Cited in the file of this patent

UNITED STATES PATENTS

| | | |
|---|---|---|
| 1,358,102 | Olds | Nov. 9, 1920 |
| 2,257,315 | Sorensen | Sept. 30, 1941 |
| 2,572,144 | Healy | Oct. 23, 1951 |
| 2,735,059 | Schaelchlin | Feb. 14, 1956 |